US012781843B2

(12) United States Patent
Oh et al.

(10) Patent No.: US 12,781,843 B2
(45) Date of Patent: Nov. 3, 2026

(54) METHOD FOR DESIGNING CYCLOIDAL GEAR TOOTH PROFILE OF GEAR SHIFT ACTUATOR

(71) Applicant: DAE-IL CORPORATION, Ulsan (KR)

(72) Inventors: Jong Sun Oh, Gyeonggi-do (KR); Chul yong Kang, Ulsan (KR); Soo Bong Cho, Busan (KR); Jae Seung Kim, Ulsan (KR)

(73) Assignee: DAE-IL CORPORATION, Ulsan (KR)

( * ) Notice: Subject to any disclaimer, the term of this patent is extended or adjusted under 35 U.S.C. 154(b) by 520 days.

(21) Appl. No.: 18/038,920

(22) PCT Filed: Nov. 24, 2021

(86) PCT No.: PCT/KR2021/017396
§ 371 (c)(1),
(2) Date: May 25, 2023

(87) PCT Pub. No.: WO2022/114773
PCT Pub. Date: Jun. 2, 2022

(65) Prior Publication Data
US 2024/0093771 A1 Mar. 21, 2024

(30) Foreign Application Priority Data
Nov. 25, 2020 (KR) ........................ 10-2020-0159759

(51) Int. Cl.
*F16H 55/08* (2006.01)
*F16H 55/18* (2006.01)

(52) U.S. Cl.
CPC ............. *F16H 55/18* (2013.01); *F16H 55/08* (2013.01)

(58) Field of Classification Search
CPC .... F16H 55/18; F16H 55/08; F16H 2001/325; F16H 1/32; F16H 57/0006
See application file for complete search history.

(56) References Cited

U.S. PATENT DOCUMENTS

| | | | | |
|---|---|---|---|---|
| 2005/0059524 A1* | 3/2005 | Hori | F16H 1/32 | 475/180 |
| 2016/0084348 A1* | 3/2016 | Tabuchi | F16H 55/08 | 475/180 |
| 2022/0074466 A1* | 3/2022 | Liu | F16H 57/023 | |

FOREIGN PATENT DOCUMENTS

| | | | | |
|---|---|---|---|---|
| JP | 200505076716 A | | 3/2005 | |
| JP | 2014035030 A | * | 2/2014 | F16H 1/32 |

(Continued)

OTHER PUBLICATIONS

International Search Report for Application No. PCT/KR2021/017396 dated Feb. 25, 2022; pp. 8.

*Primary Examiner* — Tisha D Lewis
(74) *Attorney, Agent, or Firm* — Nixon Peabody LLP

(57) ABSTRACT

The present invention relates to a method for designing a cycloidal gear tooth profile of a gear shift actuator, the method designing a profile to have a backlash through a change in the radius of a rolling circle of an internal or external tooth profile of a cycloidal gear, and thus enables the smooth engagement of internal teeth and external teeth, reduces the engagement range of the internal teeth and the external teeth to have excellent durability and enable power loss to be reduced, and enables the shape machining of the gear by using general cycloidal gear machining, thereby facilitating manufacturing and being capable of improving machining precision.

12 Claims, 6 Drawing Sheets

(56) References Cited

FOREIGN PATENT DOCUMENTS

| | | | |
|---|---|---|---|
| JP | 2014037851 | A | 2/2014 |
| JP | 2016065579 | A | 4/2016 |
| JP | 5970650 | B2 | 8/2016 |
| KR | 101044590 | B1 | 6/2011 |
| KR | 102294672 | B1 | 8/2021 |

* cited by examiner

FIG. 3A PRIORT ART
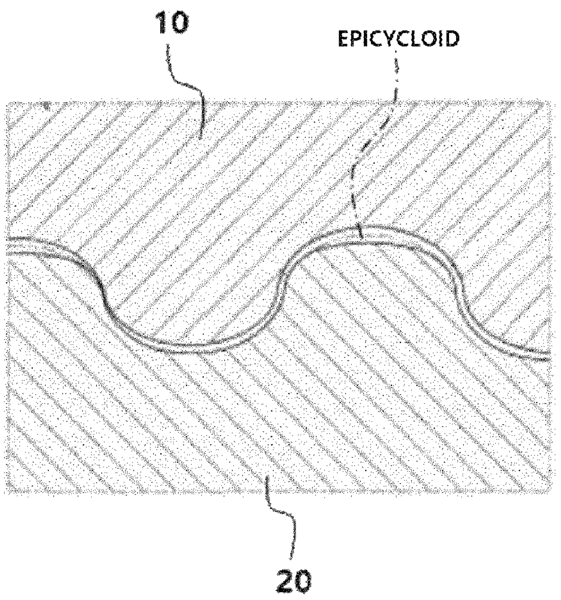
FIG. 3B PRIOR ART
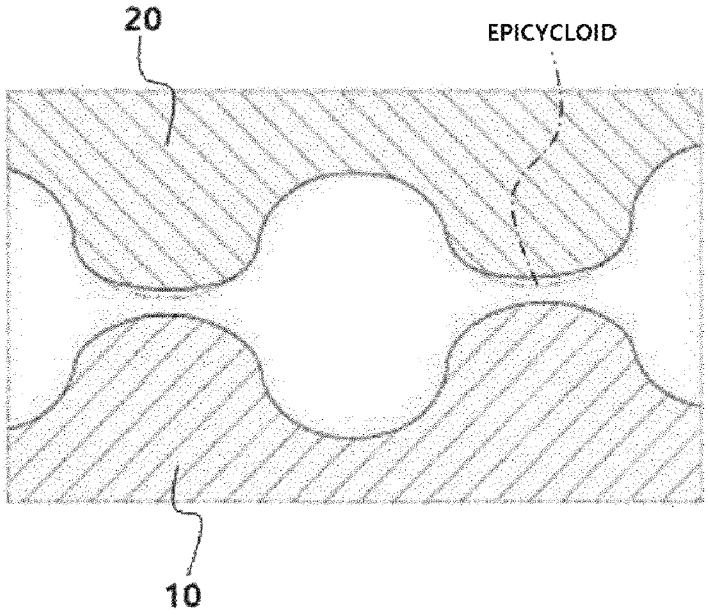

METHOD FOR DESIGNING CYCLOIDAL GEAR TOOTH PROFILE OF GEAR SHIFT ACTUATOR

CROSS-REFERENCE TO RELATED APPLICATIONS

This application is the United States National Stage of International application PCT/KR2021/017396, filed Nov. 24, 2021, which in turn, claims priority of KR application number 10-2020-0159759, filed Nov. 25, 2020, the entire disclosures of both of which are herein incorporated by reference.

TECHNICAL FIELD

The disclosure relates to a method for designing a tooth profile of a cycloidal gear of a gear shift actuator used in an automobile or the like.

BACKGROUND ART

In general, the theoretical design method of cycloidal gears is based on zero backlash of inner tooth gears and outer tooth gears, so if precise machining is not accompanied, cycloidal gears may not be smoothly driven and noise and durability may be adversely affected, and therefore, precise machining is required.

FIG. 1 is a plan view illustrating an engagement range of an inner tooth gear and an outer tooth gear when a design eccentricity of the outer tooth gear is equal to a theoretical eccentricity in a cycloidal gear of a gear shift actuator of the related art, and FIG. 2 is a plan view illustrating an engagement range of an inner tooth gear and an outer tooth gear when a design eccentricity of the outer tooth gear is set to be greater than the theoretical eccentricity in a cycloidal gear of a gear shift actuator of the related art.

Referring to FIGS. 1 and 2, in order to solve the problem, in designing a cycloidal gear of a gear shift actuator for a vehicle in the related art, there has been a technology of applying a method of designing a design eccentricity e1 of an eccentric portion of an outer tooth gear 20 rotating in mesh with an inner tooth gear 10 to be greater than a theoretical eccentricity e to narrow an engagement range of cycloidal gears, thereby reducing shear loss of rotational force to suppress a decrease in power transmission efficiency, as shown in FIG. 2.

Alternatively, in the related art, as shown in FIGS. 3A and 3B, a tooth outer diameter rolling circle of the outer tooth gear 20 using an arbitrary formula is designed to have a height lower than an epicycloid curve so that the tooth outer diameter rolling circle of the outer tooth gear 20 and a tooth inner diameter rolling circle of the inner tooth gear 10 are not accurately in mesh with each other, thereby suppressing contact between cycloidal gears to suppress a decrease in power transmission efficiency.

However, as in the related art, the power transmission efficiency may be increased by changing the eccentric amount or changing the outer diameter shape of the outer tooth gear to which an arbitrary formula is applied, but the design thereof deviates from the general rolling circle design of cycloidal gears, and thus, it is necessary to machine a shape of an arbitrary outer tooth gear, not an arc shape, using the general cycloidal gear machining method. Therefore, since a desired machining precision may not be obtained to lower machining precision, resulting in increased noise during operation and reduced durability.

RELATED ART DOCUMENT

Patent Document

1) JP 2005-076716 A (2005 Mar. 24)
2) JP 2016-065579 A (2016 Apr. 28.)

DISCLOSURE

Technical Problem

The disclosure provides a method for designing a tooth profile of a cycloidal gear of a gear shift actuator, capable of providing a backlash through a change in a rolling circle radius of a tooth profile of an inner tooth gear or an outer tooth gear of cycloidal gear, thereby reducing an engagement range between the inner tooth gear and the outer tooth gear to obtain excellent durability and reduce power loss.

SUMMARY OF INVENTION

According to an embodiment of the disclosure, there is provided a method for designing a tooth profile of a cycloidal gear of a gear shift actuator in which an outer tooth gear is provided inside the inner tooth gear, and the inner tooth gear and the outer tooth gear are engaged with each other and rotated, in which a design pitch circle radius (Ri1) of the outer tooth gear is obtained by subtracting a predetermined backlash (x) from a theoretical pitch circle radius (Ri) of the outer tooth gear, and a design rolling circle radius (ri1) of the outer tooth gear is obtained using the design pitch circle radius (Ri1) of the outer tooth gear.

In addition, the design rolling circle radius (ri1) of the outer tooth gear may be smaller than the theoretical rolling circle radius (ri) of the outer tooth gear.

In addition, the inner tooth gear may be designed with a theoretical pitch circle radius (Ro) and a theoretical rolling circle radius (ro).

In addition, an eccentric amount of the outer tooth gear may be designed to be equal to the theoretical eccentric amount (e).

In addition, a design clearance amount (T1), which is a distance between an outer diameter of a rolling circle of the inner tooth gear and an outer diameter of a rolling circle of the outer tooth gear, may be greater than a theoretical clearance amount (T).

According to another embodiment of the disclosure, there is provided a method for designing a tooth profile of a cycloidal gear of a gear shift actuator in which an outer tooth gear is provided inside the inner tooth gear, and the inner tooth gear and the outer tooth gear are engaged with each other and rotated, in which a design pitch circle radius (Ro1) of the inner tooth gear is obtained by adding a predetermined backlash (x) to a theoretical pitch circle radius (Ro) of the inner tooth gear, and a design rolling circle radius (ro1) of the inner tooth gear is obtained using a design pitch circle radius (Ro1) of the inner tooth gear.

In addition, the design rolling circle radius (ro1) of the inner tooth gear may be greater than the theoretical rolling circle radius (ro) of the inner tooth gear.

In addition, the outer tooth gear may be designed with a theoretical pitch circle radius (Ri) and a theoretical rolling circle radius (ri).

In addition, an eccentric amount of the outer tooth gear may be designed to be equal to the theoretical eccentric amount (e).

In addition, a design clearance amount (T1), which is a distance between an outer diameter of a rolling circle of the inner tooth gear and an outer diameter of a rolling circle of the outer tooth gear, may be greater than the theoretical clearance amount (T).

According to another embodiment of the disclosure, there is provided a cycloidal gear of a gear shift actuator manufactured by the method for designing a tooth profile of a cycloidal gear of a gear shift actuator and formed so that there is a predetermined backlash between the inner tooth gear and the outer tooth gear.

According to another embodiment of the disclosure, there is provided a gear shift actuator including the cycloidal gear of the gear shift actuator, including an input shaft coupled to any one of the inner tooth gear and outer tooth gear and an output shaft coupled to the other.

Advantageous Effects

The method for designing a tooth profile of a cycloidal gear of a gear shift actuator of the disclosure has the advantage of enabling smooth engagement between the inner tooth gear and the outer tooth gear, reducing the engagement range of the inner tooth gear and the outer tooth gear, and obtaining excellent durability and reducing power loss.

In addition, since a backlash is provided by changing a radius of a rolling circle of the inner tooth gear or outer tooth gear of the cycloidal gear, a shape of the gear may be machined using the general cycloidal gear machining method, thereby facilitating manufacture and improving machining precision.

DESCRIPTION OF DRAWINGS

FIGS. 3A and 3B are planar cross-sectional views illustrating a cycloidal gear in which an arbitrary formula is applied to a design of a tooth profile of an outer tooth gear in a cycloidal gear of a gear shift actuator of the related art.

BEST MODE

Hereinafter, a method for designing a tooth profile of a cycloidal gear of a gear shift actuator according to the disclosure having the configuration described above will be described in detail with reference to the accompanying drawings.

Figure 1:
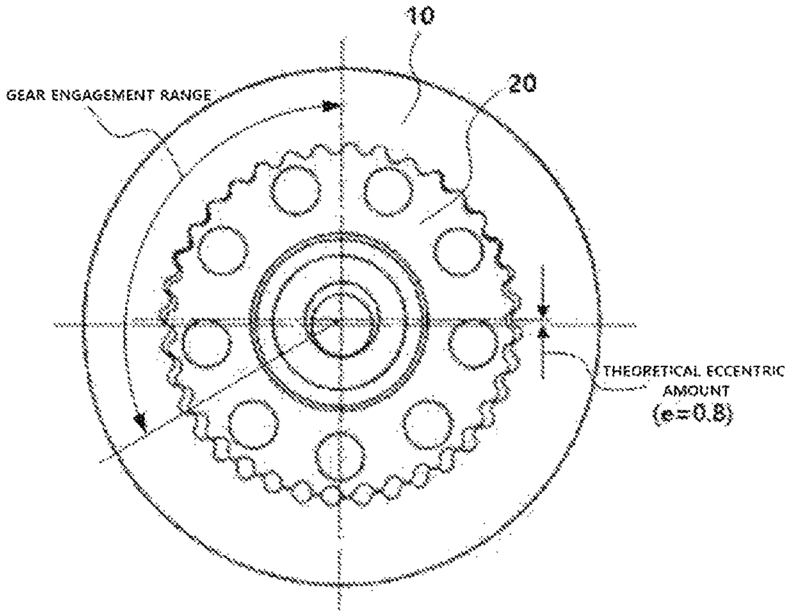
FIG. 1 PRIOR ART
FIG. 1 is a plan view illustrating an engagement range of an inner tooth gear and an outer tooth gear when a design eccentricity of the outer tooth gear is equal to a theoretical eccentricity in a cycloidal gear of a gear shift actuator of the related art.
Figure 2:
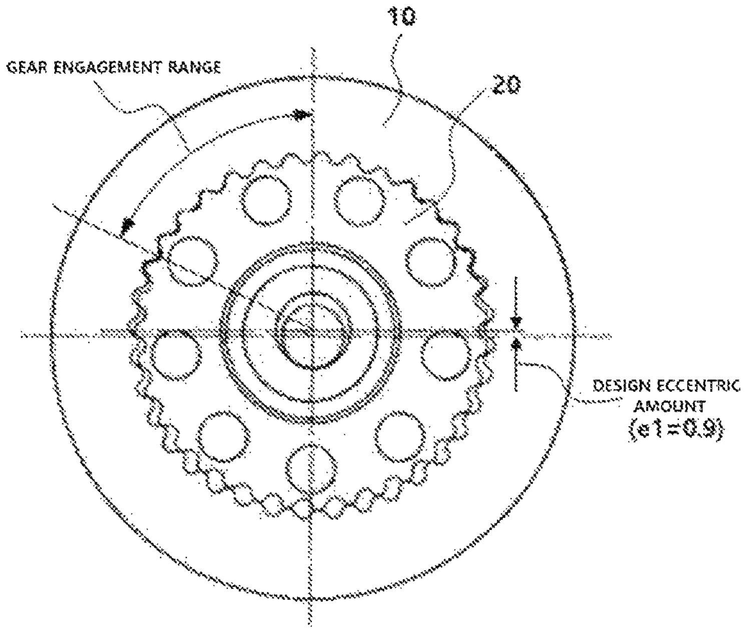
FIG. 2 PRIOR ART
FIG. 2 is a plan view illustrating an engagement range of an inner tooth gear and an outer tooth gear when a design eccentricity of the outer tooth gear is set to be greater than the theoretical eccentricity in a cycloidal gear of a gear shift actuator of the related art.
Figure 4:
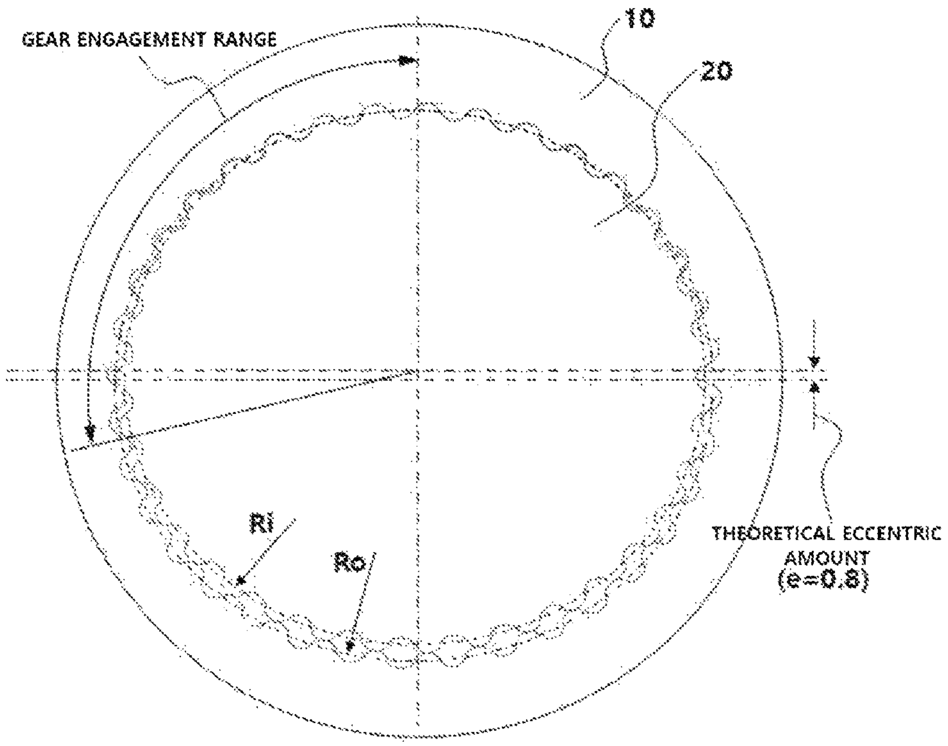
FIG. 4 PRIOR ART
FIGS. 4, 5A, and 5B are plan views illustrating a cycloidal gear designed by applying a basic formula (a theoretical formula) of a cycloidal gear of a gear shift actuator of the related art.
Figure 5A:
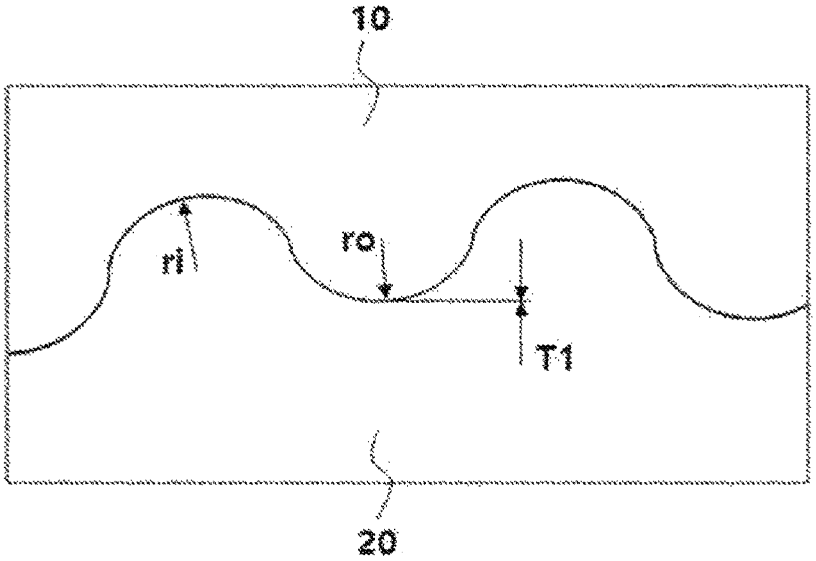
FIG. 5A PRIOR ART
Figure 5B:
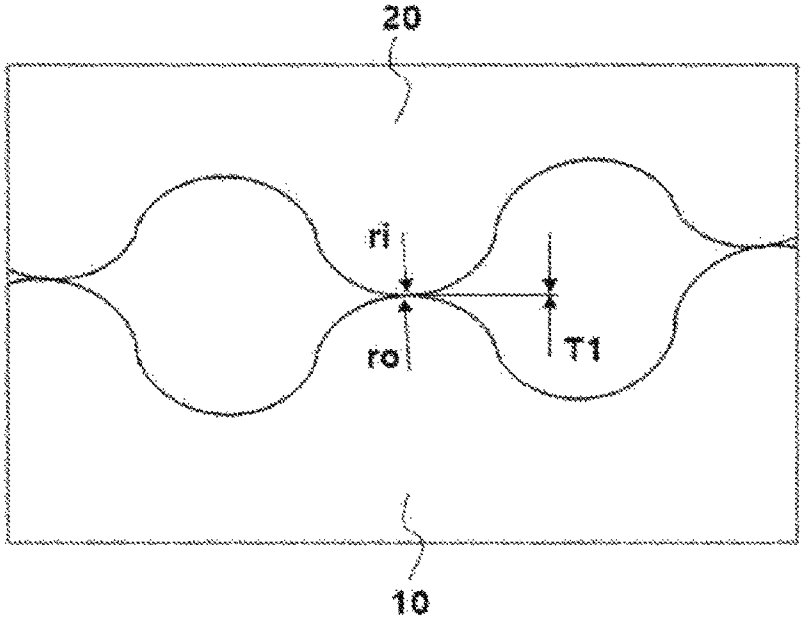
FIG. 5B PRIOR ART

FIGS. 4, 5A and 5B are plan views illustrating a cycloidal gear designed by applying a basic formula (a theoretical formula) of a cycloidal gear of a gear shift actuator of the related art.

First, referring to FIGS. 4, 5A and 5B, basic formulas (theoretical formulas) for designing a tooth profile of a cycloidal gear of a gear shift actuator of the related art are as follows.

$$\text{Theoretical pitch circle radius of inner tooth gear } (Ro)=\{\text{cycloid module } (M)\times\text{number of teeth of inner tooth gear } (No)\}/2 \quad \text{<Formula 1>}$$

$$\text{Theoretical rolling circle radius of inner tooth gear } (ro)=\{\text{theoretical pitch circle radius of inner tooth gear } (Ro)/\text{number of teeth of inner tooth gear } (No)\}/2 \quad \text{<Formula 2>}$$

$$\text{Theoretical pitch circle radius of outer tooth gear } (Ri)=\{\text{cycloid module } (M)\times\text{number of teeth of outer tooth gear } (Ni)\}/2 \quad \text{<Formula 3>}$$

$$\text{Theoretical rolling circle radius of outer tooth gear } (ri)=\{\text{Theoretical pitch circle radius of outer tooth gear } (Ri)/\text{number of teeth of outer tooth gear } (Ni)\}/2 \quad \text{<Formula 4>}$$

As described above, a cycloidal gear designed by applying the basic formula (theoretical formula) of the cycloidal gear of the gear shift actuator of the related art includes an outer tooth gear 20 inside the inner tooth gear 10, and it is designed so that the center of the outer tooth gear 20 is eccentric by a theoretical eccentric amount (e) to one side from the center of the inner tooth gear 10. In addition, on the side in which a distance between the inner tooth gear 10 and the outer tooth gear 20 is close, the teeth of the gears may be engaged with each other and rotated by a specific angular range (a gear engagement range) in a state in which the teeth of the gears are spaced apart from each other with a specific theoretical clearance amount T, and on the side in which a distance between the inner tooth gear 10 and the outer tooth gear 20 is far, the teeth of the gears are spaced apart from each other with a specific theoretical clearance amount T and may not be engaged with each other.

Figure 6:
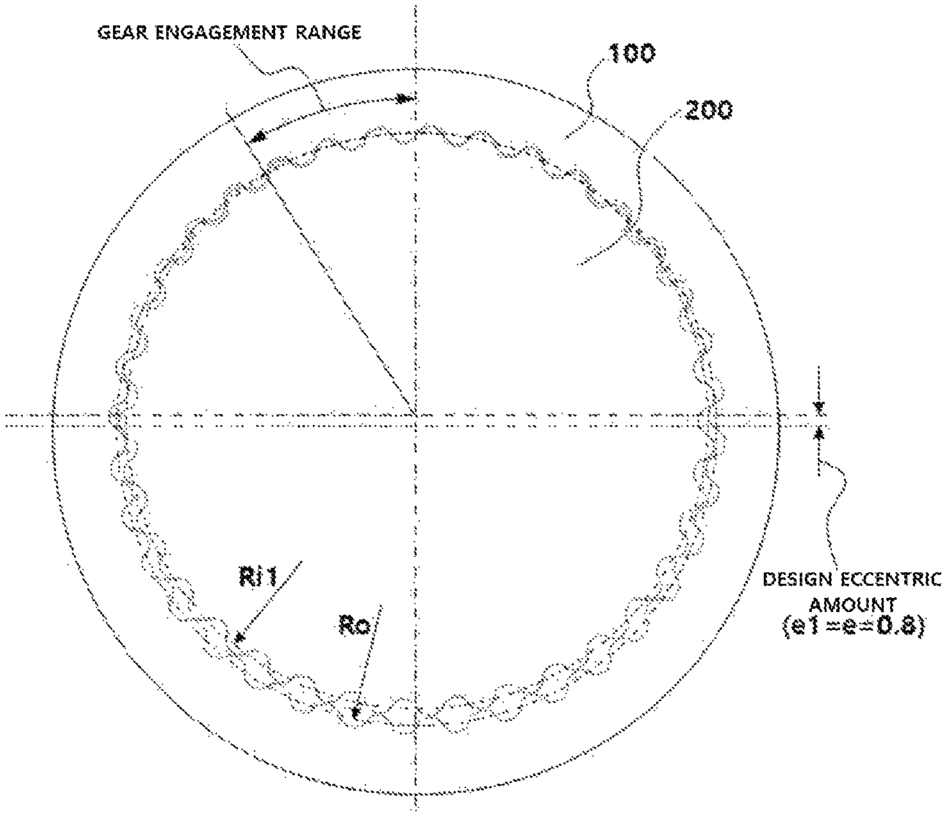
FIGS. 6, 7A, and 7B are plan views illustrating a cycloidal gear designed by applying a method for designing a tooth profile of a cycloidal gear of a gear shift actuator according to an embodiment of the disclosure.
Figure 7A:
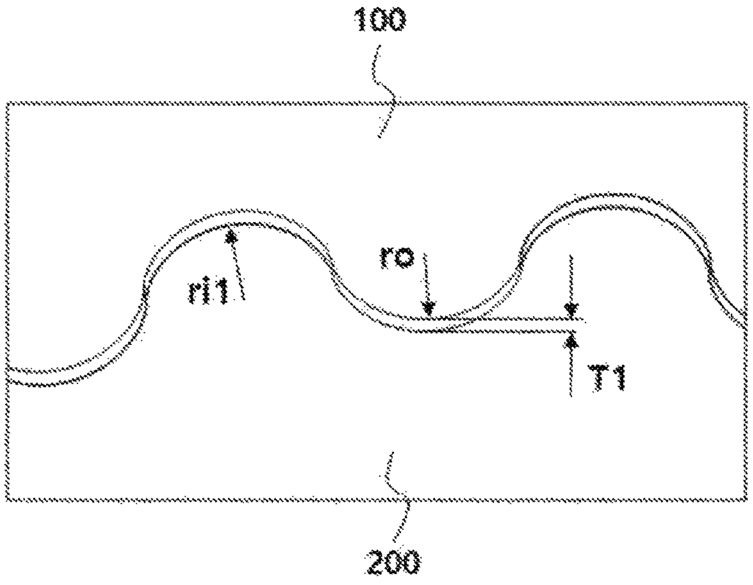
Figure 7B:
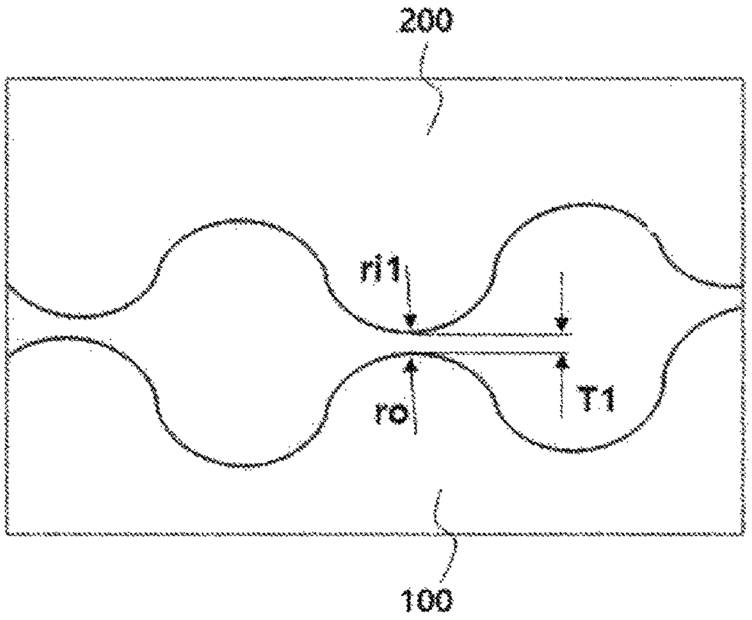

FIGS. 6, 7A, and 7B are plan views illustrating a cycloidal gear designed by applying a method for designing a tooth profile of a cycloidal gear of a gear shift actuator according to an embodiment of the disclosure.

Referring to FIGS. 6, 7A, and 7B, a formula for designing a tooth profile of the cycloidal gear of the gear shift actuator according to an embodiment of the disclosure is as follows.

$$\text{Design pitch circle radius of outer tooth gear } (Ri1)=\{\text{cycloid module } (M)\times\text{number of teeth of outer tooth gear } (Ni)\}/2-\text{backlash } (x) \quad \text{<Formula 5>}$$

$$\text{Design rolling circle radius of outer tooth gear } (ri1)=\{\text{design pitch circle radius of outer tooth gear } (Ri1)/\text{number of teeth of outer tooth gear } (Ni)\}/2 \quad \text{<Formula 6>}$$

Here, in the method for designing a tooth profile of a cycloidal gear of a gear shift actuator according to an embodiment of the disclosure, an inner tooth gear 100 may be designed with a theoretical pitch circle radius Ro and a theoretical rolling circle radius ro, and a theoretical eccentric amount e1 of an outer tooth gear 200 may be designed to be equal to the theoretical eccentric amount e.

Therefore, as described above, the cycloidal gear designed by applying the method for designing a tooth profile of a cycloidal gear of a gear shift actuator according to an embodiment of the disclosure may be designed such that the outer tooth gear 200 is provided inside the inner tooth gear 100 and the center of the outer tooth gear 200 is eccentric from the center the inner tooth gear 100 by the theoretical eccentric amount e to one side. In addition, on the side where a distance between the inner tooth gear 100 and the outer tooth gear 200 is close, the teeth of the gears are spaced apart from each other with a specific design clearance amount T1, so that the teeth may be engaged with each other by a specific angular range (a gear engagement range) to be rotated, and on the side where the distance between the inner tooth gear 100 and the outer tooth gear 200 is far, the teeth of the gears are spaced apart from each other with a specific design clearance amount T1 and may not be engaged with each other. At this time, as shown, it can be seen that the gear engagement range of the disclosure is significantly reduced, compared to the gear engagement range of the cycloidal gear designed by applying the basic formula.

Here, since the outer tooth gear 200 according to the disclosure is applied with a predetermined backlash value x, the design pitch circle radius Ri1 of the outer tooth gear is designed to be smaller than the theoretical pitch circle radius Ri of the outer tooth gear. Also, accordingly, the design rolling circle radius ri1 of the outer tooth gear is smaller than the theoretical rolling circle radius ri of the outer tooth gear. That is, in the disclosure, by forming the pitch circle radius of the outer tooth gear 200 to be smaller than the theoretical value by applying backlash, the design rolling circle radius ri1 of the outer tooth gear may be formed to be smaller than the theoretical value, so that an oil film may be maintained between tooth surfaces of the gears by the amount of backlash, thereby designing a cycloidal gear with excellent durability and high efficiency (reduced power loss). In addition, since the outer tooth gear is designed in the form of a theoretical cycloid curve rather than a form arbitrarily deformed from the cycloid curve form, the shape of the gear may be machined using the general cycloidal gear machining method, and therefore, manufacture may be facilitated and machining precision may be improved.

In addition, as shown, in the cycloidal gear designed by applying the method for designing a tooth profile of a cycloidal gear of a gear shift actuator according to an embodiment of the disclosure, since the design rolling circle radius ri1 of the outer tooth gear is formed to be smaller than the theoretical value, the design clearance amount T1, which is a distance between the outer diameter of the rolling circle of the inner tooth gear 100 and the outer diameter of the rolling circle of the outer tooth gear 200, may be formed to be greater than the theoretical clearance amount T. Accordingly, an oil film may be maintained in the gap between the tooth surfaces of the inner tooth gear 100 and the outer tooth gear 200, and a contact area between the tooth surfaces of the gears may be reduced, resulting in excellent durability and reduced power loss.

In addition, a formula for designing a tooth profile of a cycloidal gear of a gear shift actuator according to another embodiment of the disclosure is as follows.

Design pitch circle radius of inner tooth gear ($Ro1$) ={cycloid module ($M$)×number of teeth of inner tooth gear ($No$)}/2+backlash ($x$) <Formula 7>

Design rolling circle radius of inner tooth gear ($ro1$) ={design pitch circle radius of inner tooth gear ($Ro1$)/number of teeth of inner tooth gear ($No$)}/2 <Formula 8>

Here, in the method for designing a tooth profile of a cycloidal gear of a gear shift actuator according to another embodiment of the disclosure, the outer tooth gear 200 may be designed with a theoretical pitch circle radius Ri and a theoretical rolling circle radius ri, and the eccentric amount e1 of the outer tooth gear 200 may be designed to be equal to the theoretical eccentric amount e.

Therefore, as described above, the cycloidal gear designed by applying the method for designing a tooth profile of a cycloidal gear of a gear shift actuator according to an embodiment of the disclosure may be designed such that the outer tooth gear 200 is provided inside the inner tooth gear 100 and the center of the outer tooth gear 200 is eccentric from the center the inner tooth gear 100 by the theoretical eccentric amount e to one side. In addition, on the side where a distance between the inner tooth gear 100 and the outer tooth gear 200 is close, the teeth of the gears are spaced apart from each other with a specific design clearance amount T1, so that the teeth may be engaged with each other by a specific angular range (a gear engagement range) to be rotated, and on the side where the distance between the inner tooth gear 100 and the outer tooth gear 200 is far, the teeth of the gears are spaced apart from each other with a specific design clearance amount T1 and may not be engaged with each other. Also, in this case, as shown, it can be seen that the gear engagement range of the disclosure is significantly reduced, compared to the gear engagement range of the cycloidal gear designed by applying the basic formula.

Here, since the inner tooth gear 100 according to the disclosure is applied with a predetermined backlash value x, the design pitch circle radius Ro1 of the inner tooth gear is designed to be greater than the theoretical pitch circle radius Ro of the inner tooth gear. Also, accordingly, the design rolling circle radius ro1 of the inner tooth gear is greater than the theoretical rolling circle radius ro of the inner tooth gear. That is, in the disclosure, by forming the pitch circle radius of the inner tooth gear 100 to be greater than the theoretical value by applying backlash, the design rolling circle radius ro1 of the inner tooth gear may be formed to be greater than the theoretical value, so that an oil film may be maintained between tooth surfaces of the gears by the amount of backlash, thereby designing a cycloidal gear with excellent durability and high efficiency (reduced power loss). In addition, since the outer tooth gear is designed in the form of a theoretical cycloid curve rather than a form arbitrarily deformed from the cycloid curve form, the shape of the gear may be machined using the general cycloidal gear machining method, and therefore, manufacture may be facilitated and machining precision may be improved.

In addition, in the cycloidal gear designed by applying the method for designing a tooth profile of a cycloidal gear of a gear shift actuator according to another embodiment of the disclosure, since the design rolling circle radius ro1 of the inner tooth gear is formed to be greater than the theoretical value, the design clearance amount T1, which is a distance between the outer diameter of the rolling circle of the inner tooth gear 100 and the outer diameter of the rolling circle of the outer tooth gear 200, may be formed to be greater than the theoretical clearance amount T. Accordingly, an oil film may be maintained in the gap between the tooth surfaces of the inner tooth gear 100 and the outer tooth gear 200, and a contact area between the tooth surfaces of the gears may be reduced, resulting in excellent durability and reduced power loss.

In addition, the cycloidal gear of the gear shift actuator of the disclosure is designed and then manufactured by the method for designing a tooth profile of a cycloidal gear of a gear shift actuator as described above, so that a predetermined backlash may be formed between the inner tooth gear 100 and the outer tooth gear 200.

In addition, the gear shift actuator of the disclosure may include the aforementioned cycloidal gear and may include an input shaft coupled to either the inner tooth gear 100 or the outer tooth gear 200 and an output shaft coupled to the other.

The disclosure is not limited to the above embodiments, and the scope of application is diverse and a person skilled in the art to which the disclosure pertains may practice various modifications without departing from the gist of the disclosure claimed in the claims.

DESCRIPTION OF REFERENCE NUMERALS

100: inner tooth gear, 200: outer tooth gear
Ro: theoretical pitch circle radius of inner tooth gear
ro: theoretical rolling circle radius of inner tooth gear
Ro1: design pitch circle radius of inner tooth gear
ro1: design rolling circle radius of inner tooth gear
Ri: theoretical pitch circle radius of outer tooth gear
ri: theoretical rolling circle radius of outer tooth gear
Ri1: design pitch circle radius of outer tooth gear
ri1: design rolling circle radius of outer tooth gear

The invention claimed is:

1. A cycloidal gear of a gear shift actuator in which an outer tooth gear is provided inside an inner tooth gear and the inner tooth gear and the outer tooth gear are engaged with each other and rotated, wherein a design pitch circle radius (Ri1) of the outer tooth gear is obtained by subtracting a predetermined backlash (x) from a theoretical pitch circle radius (Ri) of the outer tooth gear;

thereby obtaining a design rolling circle radius (ri1) of the outer tooth gear which is smaller than a theoretical rolling circle radius (ri) of the outer tooth gear using the design pitch circle radius (Ri1) of the outer tooth gear;

wherein the design rolling circle radius (ri1) of the outer tooth gear conforms to following formula:

design rolling circle radius (*ri*1) of outer tooth gear={design pitch circle radius of outer tooth gear (*Ri*1)/number of teeth of outer tooth gear (*Ni*)}/2.

2. The cycloidal gear of claim 1, wherein the inner tooth gear is designed with a theoretical pitch circle radius (Ro) and a theoretical rolling circle radius (ro).

3. The cycloidal gear of claim 1, wherein an eccentric amount of the outer tooth gear is designed to be equal to a theoretical eccentric amount (e).

4. The cycloidal gear of claim 1, wherein a design clearance amount (T1), which is a distance between an outer diameter of a rolling circle of the inner tooth gear and an outer diameter of a rolling circle of the outer tooth gear, is greater than a theoretical clearance amount (T).

5. A cycloidal gear of a gear shift actuator in which an outer tooth gear is provided inside an inner tooth gear, and the inner tooth gear and the outer tooth gear are engaged with each other and rotated, wherein a design pitch circle radius of the inner tooth gear is defined by adding a predetermined backlash (x) to a theoretical pitch circle radius (Ro) of the inner tooth gear;

thereby obtaining a design rolling circle radius of the inner tooth gear which is greater than a theoretical rolling circle radius (ro) of the inner tooth gear using the design pitch circle radius of the inner tooth gear, wherein the design rolling circle radius of the inner tooth gear conforms to following formula, design rolling circle radius of inner tooth gear={design pitch circle radius of inner tooth gear/number of teeth of inner tooth gear (*No*)}/2.

6. The cycloidal gear of claim 5, wherein the outer tooth gear is designed with a theoretical pitch circle radius (Ri) and a theoretical rolling circle radius (ri).

7. The cycloidal gear of claim 5, wherein an eccentric amount of the outer tooth gear is designed to be equal to a theoretical eccentric amount (e).

8. The cycloidal gear of claim 5, wherein a design clearance amount (T1), which is a distance between an outer diameter of a rolling circle of the inner tooth gear and an outer diameter of a rolling circle of the outer tooth gear, is greater than the theoretical clearance amount (T).

9. A cycloidal gear of a gear shift actuator of claim 1, and formed so that there is a predetermined backlash between the inner tooth gear and the outer tooth gear.

10. A gear shift actuator including the cycloidal gear of the gear shift actuator of claim 9, comprising an input shaft coupled to any one of the inner tooth gear and outer tooth gear and an output shaft coupled to the other.

11. A cycloidal gear of a gear shift actuator of claim 5, and formed so that there is a predetermined backlash between the inner tooth gear and the outer tooth gear.

12. A gear shift actuator including the cycloidal gear of the gear shift actuator of claim 11, comprising an input shaft coupled to any one of the inner tooth gear and outer tooth gear and an output shaft coupled to the other.

* * * * *